Patented Oct. 30, 1923.

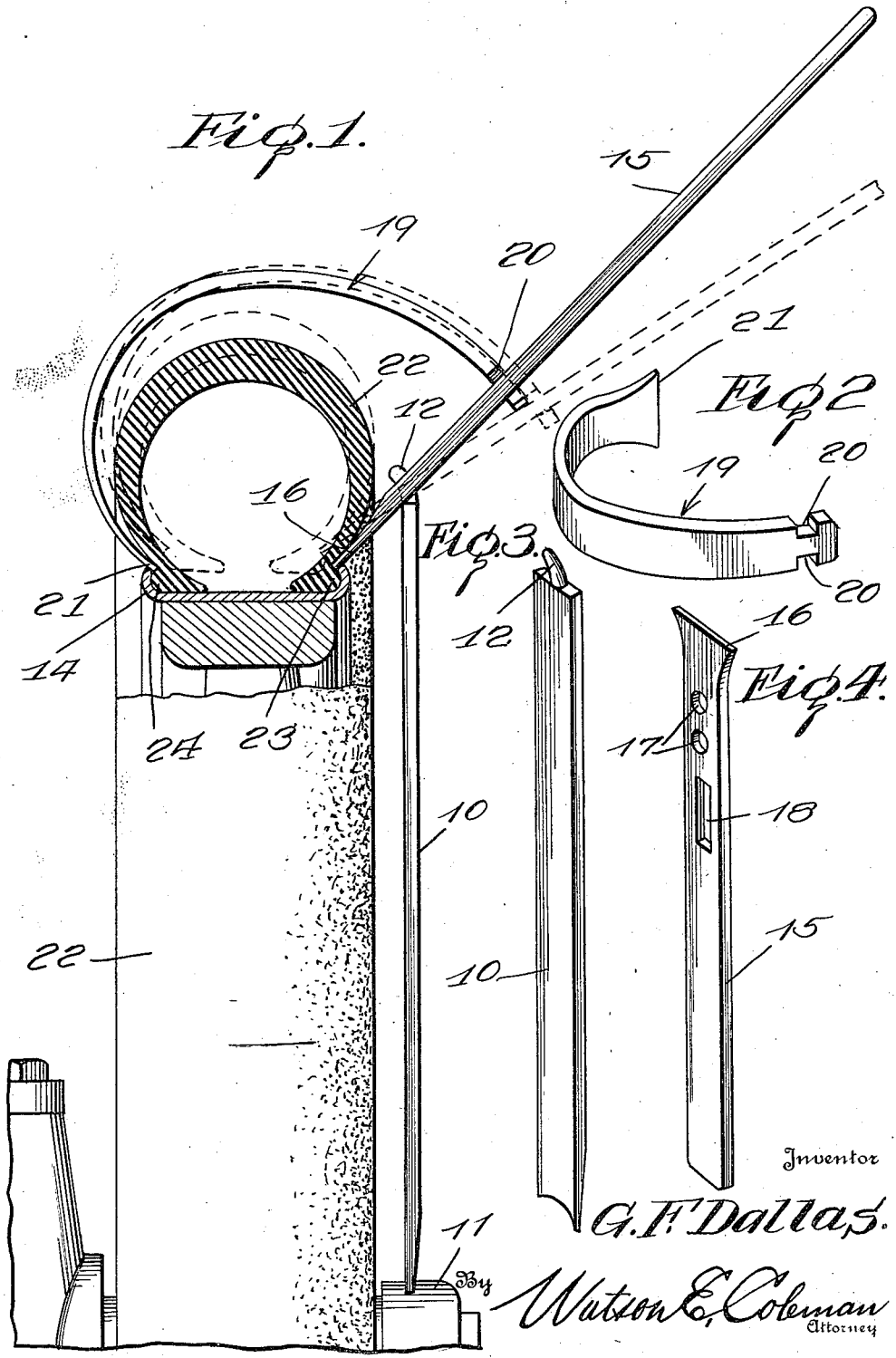

1,472,556

UNITED STATES PATENT OFFICE.

GRANVIL F. DALLAS, OF KNOXVILLE, TENNESSEE.

TIRE-HANDLING DEVICE.

Application filed June 13, 1923. Serial No. 645,192.

*To all whom it may concern:*

Be it known that I, GRANVIL F. DALLAS, a citizen of the United States, residing at Knoxville, in the county of Knox and State of Tennessee, have invented certain new and useful Improvements in Tire-Handling Devices, of which the following is a specification, reference being had to the accompanying drawings.

This invention relates to tire handling devices and more particularly to a device for removing clincher tires from the rims thereof.

A further object of the invention is to provide a device of this character formed in separable sections which are readily disconnected and which may accordingly be packed in a comparatively small space.

A further object of the invention is to provide a tool of this character whereby the beads of the tire are simultaneously forced inwardly toward one another and elevated out of engagement with the rim.

These and other objects I attain by the construction shown in the accompanying drawings, wherein for the purpose of illustration is shown a preferred embodiment of my invention and wherein:—

Figure 1 is a side elevation partially in section showing a tool constructed in accordance with my invention in use for removing a tire;

Figure 2 is a perspective of the hook section detached;

Figure 3 is a perspective of the support section detached; and

Figure 4 is a perspective of the handle section.

Referring now more particularly to the drawings, the numeral 10 indicates a supporting section, comprising a straight bar having one end thereof shaped to fit against the hub cap 11 of the wheel from which the tire is to be removed. The other end of the bar 10 is provided with a centrally disposed reduced extension 12 which is arcuately curved. This bar is of such length that when the lower end 13 thereof is placed upon the hub cap 11, the upper end thereof extends beyond the outer face of the rim 14 of the wheel. A handle portion 15 is provided forming a second straight bar, one end of which is flattened and flared as indicated at 16. Adjacent this end the bar has formed therein a plurality of centrally disposed longitudinally spaced openings 17 of a diameter such that they readily receive the reduced extension 12 of the support 10. Beyond the opening 17 from the end 16, the bar 15 has formed therein a rectangular opening 18 having its major axis extending longitudinally of the bar. The numeral 19 designates a hook section. At one end this hook section is provided in opposite faces thereof with notches 20 reducing the transverse width at this end and between the notches to such size that the connecting portion remaining between the notches may be rotated within the opening 18. From this end of the hook portion, which is curved the curvature increases toward the opposite end 21 which is flattened and broadened.

In the use of the device the support 10 has its end 13 seated upon the hub cap 11 and its upper end directed through the opening 17 of the handle 15, which will bring the end 16 of the handle 15 most conveniently into engagement with the adjacent face of the tire 22 to be removed at the bead 23 thereof. The hook portion has the end thereof bearing the notches 20 directed through the opening 18 and is then rotated so that its flat face opposes the tire and its hook end portion 21 is in engagement with the opposite face of the tire adjacent the other of the beads 24. When properly applied to the tire and wheel the handle 15 will be inclining upwardly and outwardly away from the periphery of the wheel. If the outer end of this handle portion is now moved downwardly the ends 16 and 21 of the handle 15 and hook member 19 will approach one another causing the beads 23 and 24 to approach one another. As the downward movement continues these ends will elevate lifting the engaged portion of the tire from the bead. After removal of the tire from the rim and when the sections 10, 15 and 19 are separated for placement in the tool box, the sections 10 and 15 may be employed for replacing the tire, the hooked end portion 12 of the support 10 rendering it particularly efficient for this purpose. It will, of course, be obvious that certain changes and modifications of the structure hereinbefore set forth can be made without in any manner departing from the spirit of my invention and I accordingly do not limit myself to such specific structure except as hereinafter claimed.

I claim:—

1. In a tire tool, a support adapted to engage against a wheel hub at one end and provided at its opposite end with a reduced hooked extension, a handle portion having longitudinally spaced openings adapted for the reception of said hooked portion, the handle portion being adapted at one end for engagement against a tire, the hooked portion pivoted at one end to the handle portion beyond the point of engagement of the handle portion with the support from the last named end of the handle portion, said hooked portion being adapted to bridge a tire to be removed and having its free end flattened for engagement with the tire adjacent the tread thereof.

2. In a tire tool, a support adapted to engage against a wheel hub at one end and provided at its opposite end with a reduced hooked extension, a handle portion having longitudinally spaced openings adapted for the reception of said hooked portion, the handle portion being adapted at one end for engagement against a tire, the hooked portion pivoted at one end to the handle portion beyond the point of engagement of the handle portion with the support from the last named end of the handle portion, said hooked portion being adapted to bridge a tire to be removed and having its free end flattened for engagement with the tire adjacent the tread thereof, the pivotal engagement of said hooked portion and handle portion consisting in a head formed on said hooked portion by notches formed in the sides of said hooked portion, said handle portion being provided with a longitudinally extending slot of a length equal to the width of the head of the hooked portion and of a width permitting rotation of the hooked portion therein when the notches of the hooked portion are aligned with the walls thereof.

In testimony whereof I hereunto affix my signature.

GRANVIL F. DALLAS.